United States Patent [19]

Gregoire et al.

[11] Patent Number: 5,040,642

[45] Date of Patent: Aug. 20, 1991

[54] DISC BRAKE AND CAP SEAL THEREFOR

[75] Inventors: Gabriel Gregoire, Luzarches; Lucien Trubert, Ezanville, both of France

[73] Assignee: General Motors France, France

[21] Appl. No.: 464,518

[22] Filed: Jan. 16, 1990

[51] Int. Cl.⁵ .............................. F16D 65/18
[52] U.S. Cl. .................. 188/73.44; 188/73.1
[58] Field of Search ............... 188/73.1, 73.34, 73.44, 188/73.45

[56] References Cited

U.S. PATENT DOCUMENTS

| | | | |
|---|---|---|---|
| 4,265,340 | 5/1981 | Scott et al. | 188/73.3 |
| 4,446,947 | 5/1984 | Le Deit | 188/73.34 |
| 4,611,694 | 9/1986 | Hickson et al. | 188/73.44 |
| 4,662,484 | 5/1987 | Adachi et al. | 188/73.45 |
| 4,768,626 | 9/1988 | Le Deit et al. | 188/73.44 |
| 4,784,242 | 11/1988 | Thioux | 188/73.34 |

FOREIGN PATENT DOCUMENTS

| | | |
|---|---|---|
| 0037755 | 3/1981 | European Pat. Off. . |
| 0041450 | 5/1981 | European Pat. Off. . |
| 2049846A | 3/1980 | United Kingdom . |
| 2142698B | 6/1984 | United Kingdom . |
| 2160600A | 12/1985 | United Kingdom . |
| 2202287A | 9/1988 | United Kingdom . |

Primary Examiner—Robert J. Oberleitner
Assistant Examiner—Alfred Muratori
Attorney, Agent, or Firm—Ernest E. Helms

[57] ABSTRACT

A disc brake (10) for a motor vehicle comprising a stationary support for mounting on the motor vehicle; a caliper (12) slidably mounted on the stationary support; at least one pin (14) fixed at one end (22) to either the stationary support or the caliper and slidably positioned in an axial bore (16) in the other for slidably mounting the caliper, with the other end (30) of the pin being positioned at or adjacent one end (32) of the axial bore; and a cap seal (36) sealing the one end of the axial bore, the cap seal comprising a base (38) with a continuous wall (40) upstanding from the periphery thereof which is securable to the other of the stationary support or the caliper, and an elastomeric seal (42) secured to the continuous wall for making a seal with the other of the stationary support or the caliper around the one end of the axial bore.

5 Claims, 3 Drawing Sheets

DISC BRAKE AND CAP SEAL THEREFOR

This invention relates to a disc brake for a motor vehicle, and to a cap seal for the disc brake.

Disc brakes are known which comprise a stationary support for mounting on a motor vehicle, a caliper slidably mounted on the stationary support, and at least one pin fixed to either the stationary support or the caliper and slidably inserted in an axial bore in the other. In such arrangements, it is known to seal the axial bore at the exposed end of the pin with a cap seal in order to prevent dirt and/or moisture reaching the sliding surfaces. However, it has been found that these cap seals do not always seal as required. Such a known arrangement is shown in GB Patent No. 1563405.

It is an object of the present invention to provide an arrangement in which a more efficient seal is provided.

To this end, a disc brake for a motor vehicle in accordance with the present invention comprises a stationary support for mounting on the motor vehicle; a caliper slidably mounted on the stationary support; at least one pin fixed at one end to either the stationary support or the caliper and slidably positioned in an axial bore in the other for slidably mounting the caliper, with the other end of the pin being positioned at or adjacent one end of the axial bore; and a cap seal sealing the said one end of the axial bore, the cap seal comprising a base with a continuous wall upstanding from the periphery thereof which is of substantially rigid material and which is securable to the said other of the stationary support or the caliper, and an elastomeric seal secured to the continuous wall for making a seal with the said other of the stationary support or the caliper around the said one end of the axial bore.

Preferably, the said other of the stationary support or the caliper has an annularly extending ledge formed therein around the said one end of the axial bore, and the continuous wall of the cap seal is resilient and makes an external push fit with the annularly extending ledge to secure the cap seal. Alternatively, the said other of the stationary support or the caliper may have a ridge formed therein around the said one end of the axial bore, with the continuous wall of the cap seal being resilient and making a snap fit with the ridge to secure the cap seal. As a further alternative, the said other of the stationary support or the caliper may have an annularly extending groove formed therein around the said one end of the axial bore, with the continuous wall of the cap seal being resilient and making an internal push fit with the annularly extending groove to secure the cap seal.

The elastomeric seal of the cap seal is preferably of rubber and is secured by adhesive to the continuous wall of the cap seal. In this case, the elastomeric seal is preferably secured to the free edge of the continuous wall.

Alternatively, the elastomeric seal of the cap seal may be of polymeric material which is secured by sticking to the continuous wall during polymerising of the material. In this case, the elastomeric seal is preferably secured to the inner surface of the continuous wall.

In the present invention, a substantial improvement in the sealing of the cap seal has been found compared to the previously known arrangements.

The present invention also includes a cap seal for use in a disc brake as herein described.

The present invention will now be described, by way of example, with reference to the accompanying drawings, in which.

Figure 1:
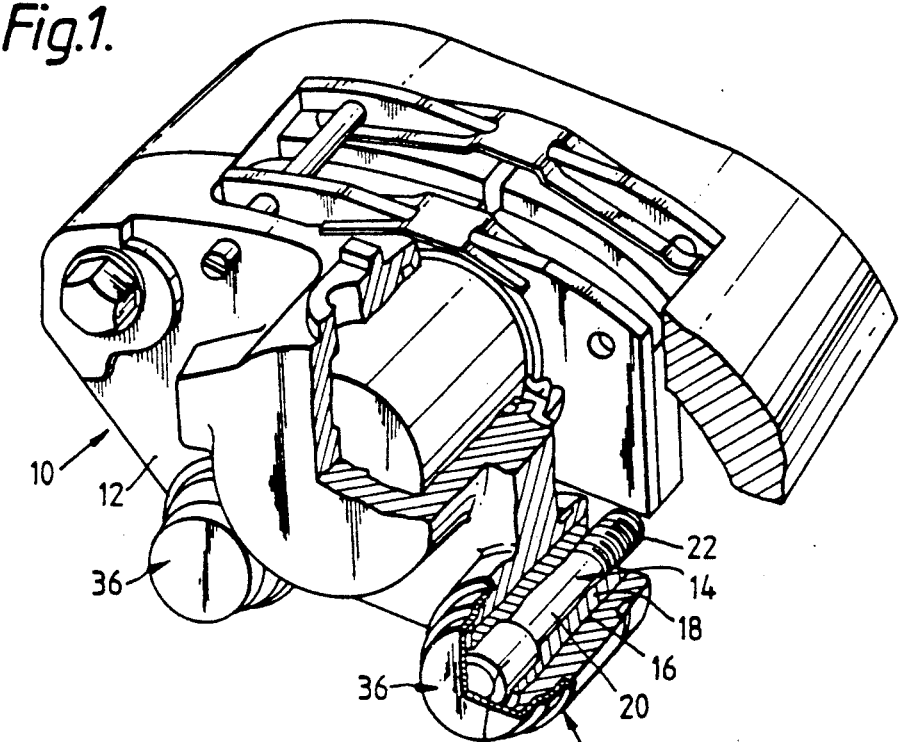
FIG. 1 is a perspective view, partially cut away, of a first embodiment of disc brake in accordance with the present invention.

Referring to FIG. 1 of the accompanying drawings, the disc brake 10 comprises a caliper 12 which is slidably mountable on a stationary support (not shown). The slidable mounting is provide by two pins 14 which are spaced apart, and each of which is slidably positioned in an axial bore 16 in the caliper 12. Each pin 14 is defined by a hollow sleeve 18 of steel and a bolt 20 which passes through the hollow sleeve and is screw threaded at one end 22 to the stationary support. Each hollow sleeve 18 extends through its respective axial bore 16 and has an outer surface 24 in sliding engagement with the surface 28 of the axial bore. The other end or head 30 of the bolt 20 is positioned in the hollow sleeve 18 at or adjacent one end 32 of the axial bore 16.

Figure 2A:
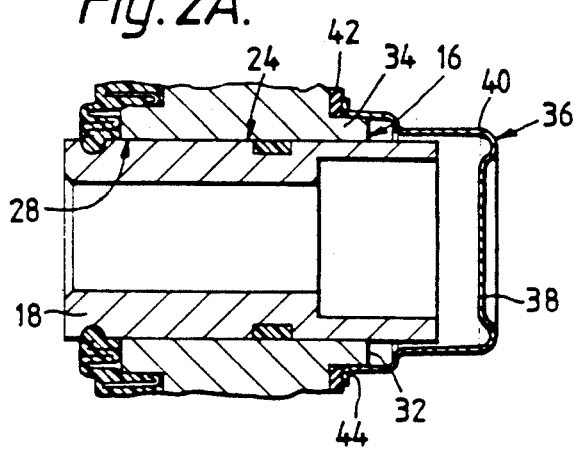
FIGS. 2A and 2B are alternative cross-sectional views of the cap seal and axial bore in area II of FIG. 1.
Figure 2B:
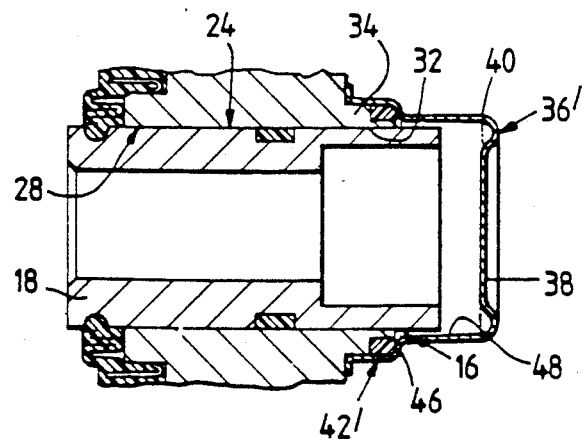

At the one end 32 of the axial bore 16, an annularly extending ledge 34 is formed in the caliper 12 around the one end 32. A cap seal 36,36' engages the annularly extending ledge 34 to substantially prevent dirt and/or moisture reaching the sliding surfaces 24,28. The cap seal 36,36' is described in more detail with reference to FIGS. 2A and 2B, respectively, in which the bolt 20 has been omitted for clarity. In both FIGS. 2A and 2B the cap seal 36,36' comprises a base 38 having a continuous wall 40 upstanding from the periphery of the base and internal therewith. The base 38 and continuous wall 40 are substantially rigid. The material of the continuous wall 40 (which is usually made from metallic material) is such that the continuous wall is resilient, and when pushed on to the annularly extending ledge 34, grips the annularly extending ledge to hold the cap seal 36,36' in position. In FIG. 2A, an elastomeric seal 42 of rubber is bonded by a suitable adhesive to the free edge 44 of the continuous wall 40. On pushing the cap seal 36 on to the annularly extending ledge 34, the elastomeric seal 42 engages the annularly extending ledge to form a seal therewith around the one end 32 of the axial bore 16. In the alternative arrangement shown in FIG. 2B, an elastomeric seal 42' of polymeric material (such as PVC) is defined by a bead 46 which is circumferentially positioned around the inner surface 48 of the continuous wall 40. The bead 46 engages the annularly extending ledge 34 and is captured between the ledge 34 and the continuous wall 40, when the cap seal 36' is pushed into position to form a seal around the one end 32 of the axial bore 16. The ledge 34 isolates the bead 46 from the axial bore 24. The bead 46 can be formed by dripping the polymeric material in liquid form onto the inner surface 48 of the continuous wall 40, and then spinning the cap seal 36' to spread the liquid. The liquid is such that it sticks and foams as it dries (polymerises) to form the bead 46.

It has been found that with both of these arrangements the seal around the one end 32 of the axial bore 16 is substantially improved over previously known arrangements, with the risk of dirt and/or moisture reaching the sliding surfaces 24,28 through the one end 32 being greatly reduced.

Further details regarding the operation of the disc brake 10 can be obtained by reference to the above mentioned GB Patent No. 1563405.

Figure 3:
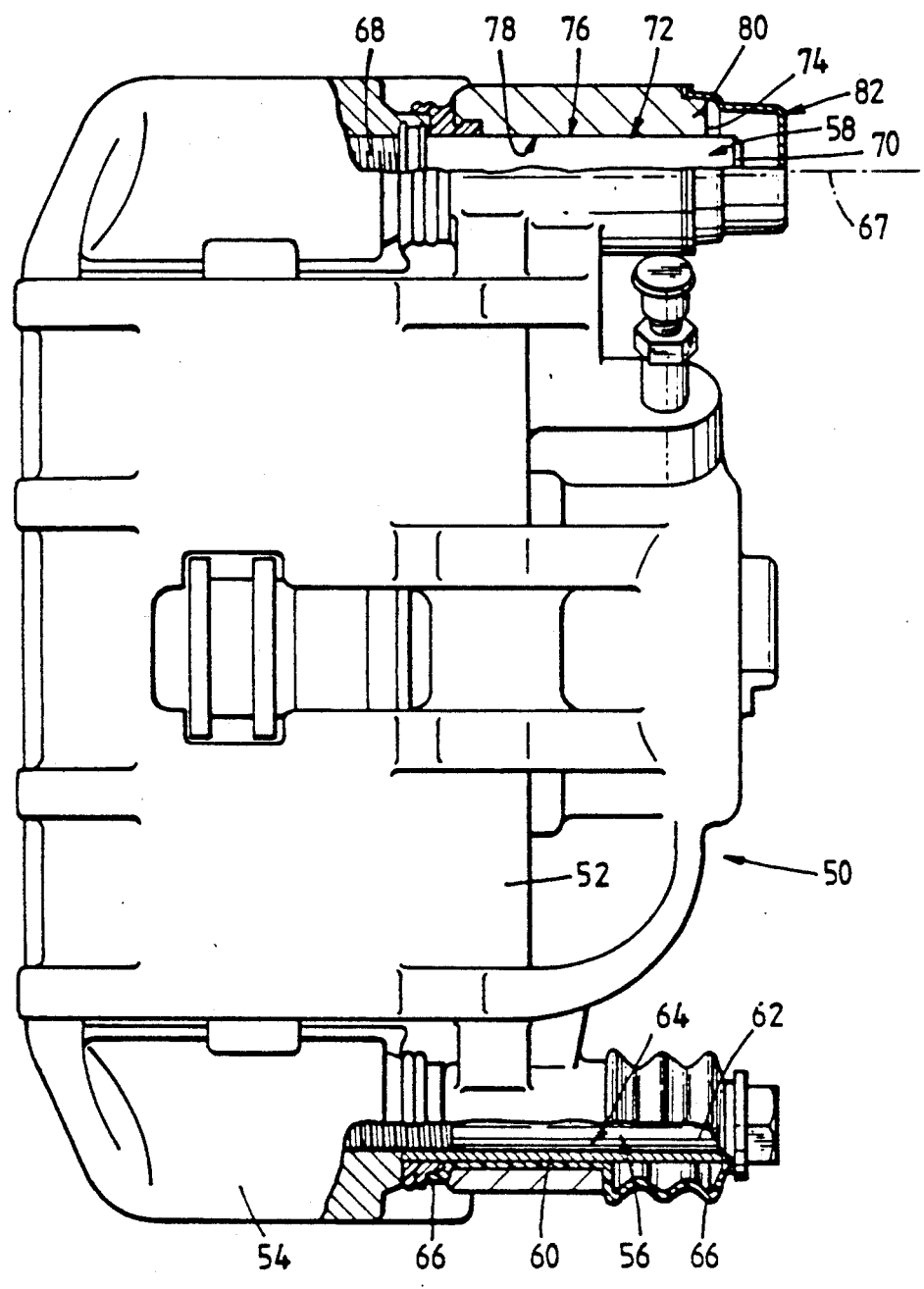
FIG. 3 is a top view, partially cut away, of a second embodiment of brake caliper in accordance with the present invention.

In the second embodiment of disc brake 50 shown in FIG. 3, the disc brake comprises a caliper 52 slidably mounted on a stationary support 54 by pins 56 and 58. Pin 56 comprises a hollow sleeve 60 with a bolt 62 passing through the hollow sleeve and screw threaded to the stationary support. The pin 56 is slidably mounted in an axial bore 64 in the caliper 52. Sealing boots 66 seal each end of the axial bore 64. Bolt 62 can be removed to allow the caliper 52 to rotate about the axis 67 of the pin 58 relative to the stationary support 54. Pin 58 is in one-piece and is screw threaded at one end 68 to the stationary support 54 with the other end 70 of the pin passing through another axial bore 72 in the caliper 52. The other end 70 of the pin 58 is positioned at or adjacent one end 74 of the axial bore 72, with the outer surface 76 of the pin 58 slidingly engaging the inner surface 78 of the axial bore 72. An annularly extending ledge 80 is formed on the caliper 52 around the one end 74 of the axial bore 72. A cap seal 82, which is substantially identical to the cap seal 36 shown in FIG. 2A, seals the one end 74 of the axial bore 72 to substantially prevent dirt and/or moisture reaching the sliding surfaces 76,78 through the one end 74.

Figure 4:
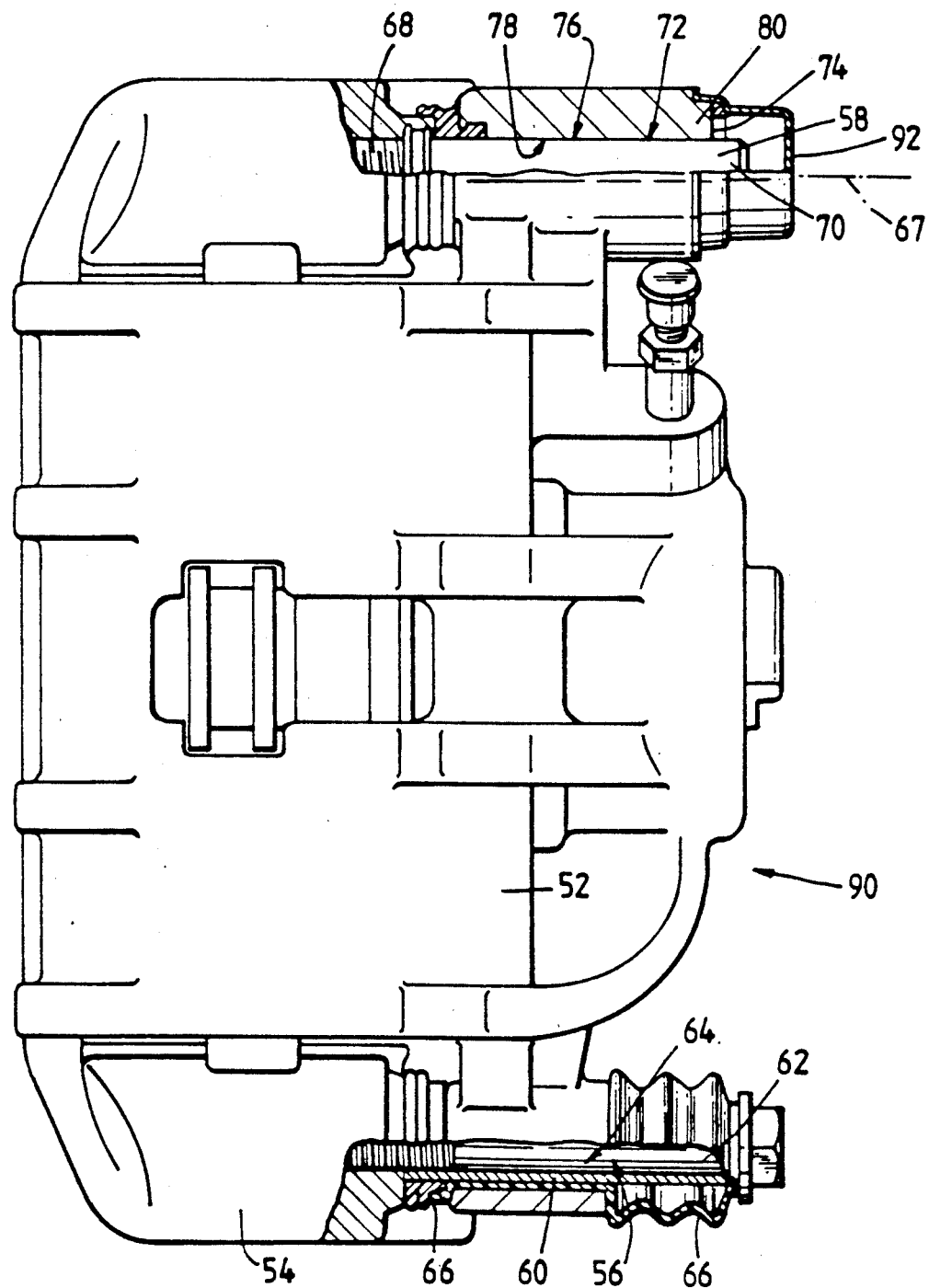
FIG. 4 is a top view, partially cut away, of a third embodiment of brake caliper in accordance with the present invention.

In the third embodiment of disc brake 90 shown in FIG. 4, like parts have been given the same reference numeral as in FIG. 3. In this embodiment, the cap seal 92 is substantially identical to the cap seal 36' shown in FIG. 2B.

Significant improvements in sealing have been found using the arrangements shown in FIGS. 3 and 4.

Whilst all of the above embodiments disclose cap seals having a continuous wall which makes an external push fit onto an annularly extending ledge, several variations of this arrangement could be made without departing from the scope of the present invention. For example, the free end of the continuous wall of the cap seal may make a snap fit with either an outwardly directed ridge or an inwardly directed ridge around the one end of the axial bore. Alternatively, the continuous wall may be an internal push fit into an annularly extending groove around the one end of the axial bore.

In all of these alternative arrangements, the elastomeric seal is secured to the continuous wall to seal the one end of the axial bore. Alternative arrangements to those disclosed above include bonding the rubber elastomeric seal to the continuous wall in an other suitable position apart from at the free edge thereof. Further, where the continuous wall makes an internal push fit, or a snap fit with an inwardly directed ledge or ridge, the elastomeric seal may be secured to the outer surface of the continuous wall.

We claim:

1. A disc brake for a motor vehicle comprising a stationary support for mounting on the motor vehicle; a caliper slidably mounted on the stationary support; at least one pin fixed at one end to either the stationary support or the caliper and slidably positioned in an axial bore in the other for slidably mounting the caliper, with the other end of the pin being positioned at or adjacent one end of the axial bore wherein the said other of the stationary support or the caliper has an annularly extending ledge formed therein around the said one end of the axis bore;

a cap seal sealing the said one end of the axial bore, the cap seal comprising a base with a continuous wall upstanding from the periphery thereof which is of substantially rigid material and which is securable to the said other of the stationary support or the caliper and wherein the continuous wall of the cap seal is resilient and makes an external push fit with the annularly extending ledge to secure the cap seal; and an elastomeric seal secured to the continuous wall for making a seal with the said other of the stationary support or the caliper around the said one end of the axial bore the elastomeric seal being captured between the continuous wall and by the ledge and the elastomeric seal being isolated from the axial bore and the pin by the ledge.

2. A disc brake as claimed in claim 1, wherein the elastomeric seal of the cap seal is of rubber and is secured by adhesive to the continuous wall of the cap seal.

3. A disc brake as claimed in claim 1, wherein the elastomeric seal of the cap seal is of polymeric material which is secured by sticking to the continuous wall during polymerising of the material.

4. A disc brake as claimed in claim 3, wherein the elastomeric seal is secured to an inner surface of the continuous wall.

5. A cap seal for a disc brake for a motor vehicle, the brake including a stationary support for mounting on the motor vehicle, a caliper slidably mounted on the stationary support, at least one pin fixed at one end to either the stationary support or the caliper and slidably positioned in an axial bore in the other for slidably mounting the caliper, with the other end of the pin being positioned at or adjacent one end of the axial bore wherein the said other of the stationary support or the caliper has an annularly extending ledge formed therein around the said one end of the axial bore, the cap seal comprising:

a base with a continuous wall upstanding from the periphery thereof which is of substantially rigid material and which is securable to the said other of the stationary support or the caliper, and wherein the continuous wall of the cap seal is resilient and makes an external push fit with the annularly extending ledge to secure the cap seal; and an elastomeric seal secured to the continuous wall for making a seal with the said other of the stationary support or the caliper around the said one end of the axial bore the elastomeric seal being captured between the continuous wall and by the ledge and the elastomeric seal being isolated from the axial bore and the pin by the ledge.

* * * * *